Patented June 16, 1942

2,286,304

UNITED STATES PATENT OFFICE 2,286,304

AZO DYE

Henry Charles Olpin, Spondon, near Derby, England, assignor to Celanese Corporation of America, a corporation of Delaware No Drawing. Application July 9, 1940, Serial No. 344,603. In Great Britain August 26, 1939

11 Claims. (Cl. 260—207)

This invention relates to the manufacture of azo dyestuffs and to the colouration therewith of cellulose ester or ether textile and other materials.

According to the invention valuable phenolic monoazo dyestuffs of the general formula $$R_1.N=N.R_2OH$$

are produced by coupling a diazotised aromatic amine of the formula $R_1.NH_2$ with a phenol of the formula $H.R_2.OH$, both $R_1$ and $R_2$ being aromatic radicals free from nitro and sulphonic acid groups, one or both of said radicals being of the diphenyl or cyclohexylbenzene series and one or both of said radicals containing an acidylamino group as a substituent. Preferably one of the two radicals $R_1$ and $R_2$ is of the benzene series, i. e. contains a single benzene nucleus, and the other is of the diphenyl series, i. e. contains two benzene nuclei directly united.

Alternatively in accordance with the invention dyes of the same structure are made by acidylating the amino group of an appropriate arylazodiphenyl or arylazocyclohexylbenzene containing a nuclear hydroxy group in one of the benzene rings which is adjacent to the azo group and also containing a primary or secondary nuclear amino group.

Further in accordance with the invention cellulose acetate or other cellulose ester or ether materials are coloured by applying thereto azo dyestuffs of the general formula given above. In this way there can be obtained colourations, particularly in yellow shades, of good fastness to light and aqueous treatments, including alkaline treatments. The colourations also possess the valuable property of being resistant to sublimation. The colourations obtained with dyes of the above general formula in which the hydroxy group or groups occupy a position ortho to the azo group, are of special fastness to wet processing under alkaline conditions, e. g. soaping.

The radicles $R_1$ and $R_2$ of the above general formulae may contain other substituents in the nuclei in addition to the acidylamino and hydroxy groups, for example, halogen, alkyl, oxyalkyl, alkoxy, oxyalkoxy, alkyl-sulphone and cyano groups. It is preferred, however, that the only substituents present should be the said acidylamino and hydroxy groups.

Advantageously the acidyl radicle in the acidylamino group or groups of the dyes of the invention is acetyl or the acidyl radicle of another lower aliphatic acid. The acidylamino group may be either an acidyl primary amino group, e. g. acetylamino, or an acidyl secondary amino group, e. g. acetyl-methylamino.

Examples of dyestuffs which can be prepared in accordance with the invention are 3-(4'-acetylaminobenzene-azo)-4-hydroxy-diphenyl, 5-(4'-acetylaminobenzene-azo) - 2 - hydroxydiphenyl, 4 - (2'-hydroxy-5'-acetylaminobenzene-azo) - diphenyl, 3-benzene-azo - 4' - acetylamino - 4 - hydroxydiphenyl and the corresponding propionylamino and acetyl methylamino derivatives.

Special mention may be made of the dye 3 - (4'-acetylaminobenzene-azo) - 4 - hydroxy - diphenyl, referred to above, and its alkyl, or alkoxy derivatives. These compounds possess good affinity for cellulose acetate materials, are readily dischargeable, resistant to sublimation, of good fastness to light, and of excellent fastness to acids, alkalies and wet treatments generally. The particular dye specified dyes cellulose acetate in pure yellow shades dischargeable to a good white, and has high tinctorial power.

Examples of amines the diazo compounds of which can be used for making dyes in accordance with the invention are aniline, toluidines, o, m and p-chloraniline, m and p-amino-acetanilide, mono - acetylbenzidine, mono - acetyl - tolidine, $\alpha$-naphthylamine, mono-acetyl-1:4-naphthylenediamine and o, or p-aminodiphenyl. Suitable coupling components include phenol, o, m or p-cresol, m or p-acetylaminophenol, $\beta$-naphthol, 4-acetylamino-1-naphthol, o and p-hydroxydiphenyl and 4'-acetylamino-4-hydroxydiphenyl. It will be understood that in each case either the coupling component or the diazo component or both must be of the diphenyl series and either or both of the two components must contain an acidylamino group. When an orthohydroxy-azo dye is required it is necessary that a coupling component should be used in which the para position to the hydroxy group is blocked and an ortho position is free.

The dyes containing a cyclohexylbenzene residue may be prepared by methods and from components similar to those outlined above, using, instead of diphenyl derivatives, derivatives of cyclohexylbenzene.

When the method of making the dyestuff involving acidylation of the amino group of an appropriate benzene-azodiphenyl or other arylazo diphenyl or arylazo-cyclohexylbenzene is used it will be understood that the conditions should be such as to avoid any substantial acidylation of the hydroxy group. This object can generally be attained by treatment with the appropriate acid anhydride or the anhydrous acid in the cold or for a short time only at higher temperatures, or by using a limited amount of the acidylating agent. For example, the azo compound can be treated in the cold or warmed gently for a short time with acetic anhydride or can be shaken with dilute caustic soda and acetic anhydride. In this way 3-(4'-acetylaminobenzene-azo-)4-hydroxydiphenyl and 5-(4'-acetylaminobenzene-azo-)2-hydroxydiphenyl can be obtained from the corresponding azo compounds containing free amino groups.

The azo dyes obtainable in accordance with the invention can be applied to cellulose ester or ether materials in the form of aqueous dispersions or solutions in organic solvents. Bath methods may be employed, that is to say methods in which the materials are allowed to absorb the azo dye from a dispersion or solution of the latter in which they are immersed. Again mechanical impregnation methods may be used, the materials being impregnated with a solution or suspension of the requisite amount of the azo dye. To this end padding or printing methods may be utilised. The mechanically impregnated material may then be aged or steamed to cause the azo dye to enter the cellulose ester or ether material.

Alternatively one or both of the components necessary for the formation of the azo dyes of the invention may be applied to the materials, for example, by mechanical impregnation methods, followed by steaming if necessary, and the colour subsequently developed by forming the dye on the materials.

The azo dyes of the present invention have substantive affinity for cellulose esters or ethers but in general substantially no affinity for cellulose or animal fibres. If, therefore, such an azo dye is applied to mixed materials containing both cellulose, e. g. cotton or regenerated cellulose, and a cellulose ester or ether, the latter alone takes up the azo dye and the cellulose component of the material remains uncoloured. By suitably colouring the cellulose component of such mixed material with dyestuffs resisting the cellulose ester or ether component of the materials solid shades or two colour effects can readily be obtained according to the components and dyes selected. The dyestuff for the cellulose portion can be applied before or after the application of the dye for the cellulose ester or ether portion.

The new dyes are also of value for colouring cellulose ester or ether solutions, especially lacquers and spinning solutions. By shaping and setting such solutions in the form of filaments, straws, films and the like, valuable coloured products can be produced. For example, coloured cellulose acetate filaments can be produced by dry spinning such coloured solutions.

The invention, so far as it relates to the colouration of materials, is particularly concerned with the production of coloured cellulose acetate products. The new dyes may, however, be used for the production of coloured products of other cellulose esters, for example cellulose formate, propionate, butyrate or acetate-butyrate, or of cellulose ethers, for example methyl, ethyl or benzyl cellulose.

The invention is illustrated by the following examples, all parts being by weight:

*Example 1*

15 parts of p-aminoacetanilide are stirred into 200 parts of water, cooled to 0–5° C. by addition of crushed ice, and 35 parts of 32% hydrochloric acid added. 7 parts of sodium nitrite dissolved in water are now added, and the ice-cold mixture stirred until diazotisation is complete.

17 parts of p-hydroxydiphenyl are dissolved in about 500 parts of water with the addition of 4 parts of caustic soda and made up to 1500 parts by addition of water and crushed ice to adjust the temperature to 0–5° C. The diazo solution is then slowly run in with stirring, the coupling liquid being maintained alkaline throughout by simultaneous addition of sodium carbonate solution. When coupling is complete the dyestuff is filtered off and washed well with water. It gives yellow shades on cellulose acetate fibres.

A similar dyestuff is obtained using p-cyclohexylphenol in place of p-hydroxydiphenyl.

*Example 2*

In the above example the p-hydroxydiphenyl is replaced by an equal quantity of o-hydroxydiphenyl, procedure being otherwise precisely as in that example. A dyestuff is obtained which yields yellow shades on cellulose acetate fibres.

*Example 3*

16.9 parts of p-aminodiphenyl are dissolved in 300 parts of water with the aid of 35 parts of 32% hydrochloric acid, and cooled to 0°–5° C. by addition of crushed ice. 7 parts of sodium nitrite dissolved in water are then added, and stirring continued till diazotisation is complete. 15.1 parts of para-acetylamino-phenol are dissolved in 500 parts of water with the addition of 4 parts of caustic soda, and made up to 1500 parts by addition of water and crushed ice. The diazo solution is then slowly run in with stirring, the coupling liquid being maintained alkaline throughout by simultaneous addition of sodium carbonate solution. When coupling is complete the dyestuff is filtered off, and washed well. It dyes cellulose acetate yellow shades.

*Example 4*

15 parts of 3-(4'-aminobenzene-azo)-4.hydroxydiphenyl (obtainable by coupling diazotised p-nitraniline with p-hydroxydiphenyl and reduction of the nitro group in the product) are warmed with 7 parts of acetic anhydride and 50 parts of glacial acetic, to a temperature of about 50° C. The mixture is poured into water and the product filtered off. It is identical with the product of Example 1.

*Example 5*

100 gms. of a 10% aqueous paste of 3-(4'-acetylaminobenzene-azo)-4-hydroxydiphenyl prepared as in Example 1 or 4 are warmed with 30 gms. of Turkey red oil, diluted with about 1 litre of boiling ¼ gm. per litre soap solution and added to a luke-warm dyebath set with ¼ gm. per litre soap, the final volume being about 30 litres. 1 kilogram of a previously scoured cellulose acetate knitted or woven fabric is now entered, and the temperature raised slowly to 75–80° C., being maintained thereat for 1–1½ hours, when it is washed off well and dried. A full bright yellow is obtained of good fastness properties. It is readily dischargeable with both sodium formaldehyde-sulphoxylate and soluble zinc formaldehyde-sulphoxylate.

Having described my invention, what I desire to secure by Letters Patent is:

1. Process for the production of a phenolic mono-azo dye, which comprises coupling a diazotized aromatic amine, said diazotized amine containing an acidylamino group, with a phenol selected from the class of mono-hydroxy diphenyls and mono-hydroxy-cyclohexyl-benzenes, both diazo compound and coupling compound being free from nitro and sulphonic groups.

2. Process for the production of a phenolic mono-azo dye which comprises coupling a mono-hydroxy-diphenyl with a diazotized aromatic amine, said diazotized amine containing an acidylamino group and, as the sole carbon ring, a single benzene ring, both components being free from nitro and sulphonic groups.

3. Process for the production of a phenolic mono-azo dye which comprises coupling a p-hydroxy-diphenyl with a diazotized aromatic amine, said diazotized amine containing an acidylamino group and, as the sole carbon ring, a single benzene ring, both components being free from nitro and sulphonic groups.

4. Process for the production of a phenolic mono-azo dye, which comprises coupling diazotized p-amino-acetanilide with p-hydroxy-diphenyl.

5. Process for the production of a phenolic mono-azo dye, which comprises coupling diazotized m-amino-acetanilide with p-hydroxy-diphenyl.

6. Process for the production of a phenolic mono-azo dye, which comprises coupling diazotized p-amino-acetanilide with o-hydroxy-diphenyl.

7. Phenolic mono-azo dyes of the formula $R_1-N=N-R_2.OH$ wherein $R_1$ is an aryl radicle containing an acidylamino group, and $R_2$ is a radicle selected from the class of diphenyl radicles and cyclohexyl-benzene radicles, both $R_1$ and $R_2$ being free from nitro and sulphonic groups.

8. A phenolic mono-azo dye of the formula $R_1-N=N-R_2-OH$ wherein $R_1$ is an aryl radicle containing an acidylamino group and, as the sole carbon ring, a single benzene ring, and $R_2$ is a diphenyl radicle, both $R_1$ and $R_2$ being free from nitro and sulphonic acid groups.

9. 3-(4'-acetylamino-benzene-azo)-4-hydroxydiphenyl.

10. 3-(3'-acetylamino-benzene-azo)-4-hydroxydiphenyl.

11. 5-(4'-acetylamino-benzene-azo)-2-hydroxydiphenyl.

HENRY CHARLES OLPIN.